Oct. 9, 1956  L. SCOTT  2,765,655
TORSION SPRING TESTING DEVICES
Filed Aug. 17, 1954

INVENTOR.
LESTER SCOTT,
BY
ATTYS.

United States Patent Office 2,765,655
Patented Oct. 9, 1956

2,765,655

TORSION SPRING TESTING DEVICES

Lester Scott, Wheatland, Ind.

Application August 17, 1954, Serial No. 450,561

4 Claims. (Cl. 73—161)

(Granted under Title 35, U. S. Code (1952), sec. 266)

The invention described herein may be manufactured and used by or for the Government of the United States of America for governmental purposes without the payment of any royalties thereon or therefor.

This invention relates to torsion spring testing and more specifically to a device for testing and checking the torque of torsion springs by applying a force to said springs and obtaining an angular displacement reading.

Many and various types of torsion springs are used in bombsights, gunsights and other types of precision control equipment. These springs often perform precision functions and it is therefore necessary that these springs be manufactured to close tolerances. In order to eliminate the necessity of replacing a defective spring in an assembled unit, it is often necessary to check and test every spring in a lot to determine whether or not the springs were manufactured to design specifications.

Although some torque testing devices are known, particularly for testing watch mainsprings and governor springs, heretofore no known universal torque testing devices were available for testing various sizes of torsion springs. Consequently it was necessary to make an individual testing device for each and every variety of spring.

The novel torque testing device described herein can readily be used to test a variety of torsion springs. The ends of the spring being tested are fixed in the device in such a manner that the spring is held in a substantial longitudinal alignment of a rotatable pulley, one end of the spring being fixed to the said pulley. When a known force is applied, the pulley will rotate through an angular displacement proportional to the applied force. As will be later shown, the device embodies appropriate means for indicating the angular displacement of the rotatable pulley.

The torque applied to the spring will be equal to the product of the known force times a lever arm equal to the radius of the pulley, and having obtained an angular displacement reading, it can readily be determined whether or not a spring meets design specifications.

It is an object of this invention to provide a universal machine for testing various sizes of precision torsion springs by an unskilled operator.

Another object of this invention is to provide a testing machine adopted for rapid insertion and removal of a torsion spring which is to be tested.

Other objects and many attendant advantages of this invention will be readily appreciated as the same becomes better understood by reference to the following detailed description when considered in connection with the accompanying drawings wherein.

Figure 1:
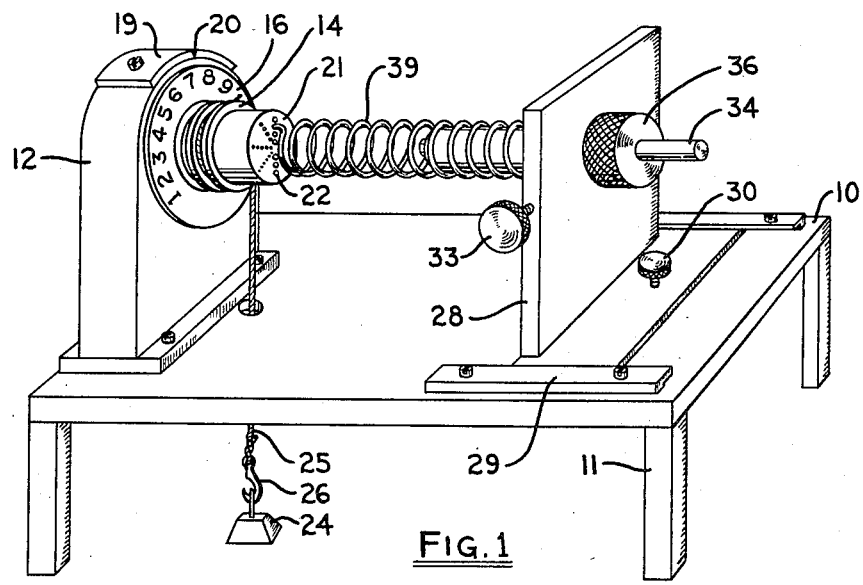
Fig. 1 is an isometric view showing the complete invention.
Figure 2:
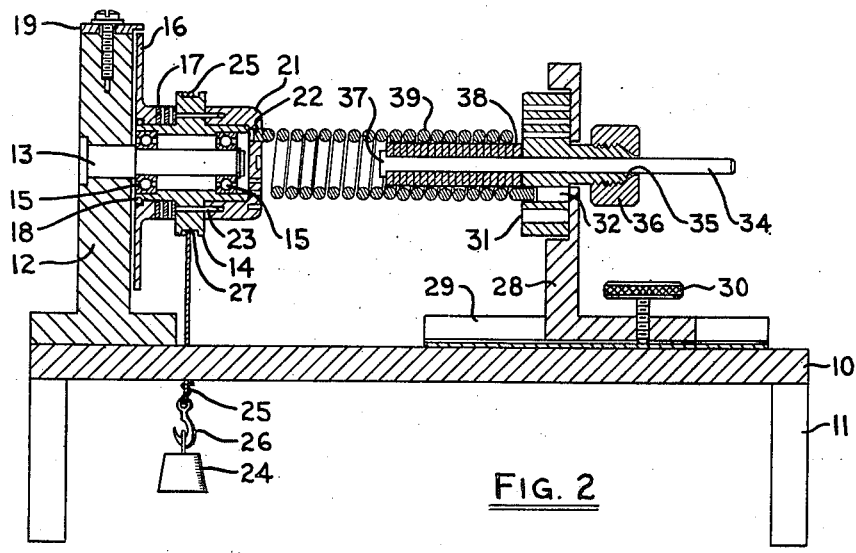
Fig. 2 is a sectional view taken through a longitudinal line of Fig. 1.

Referring to Figs. 1 and 2 of the drawings, a base 10 mounted upon legs 11 supports a fixed bracket 12 a stationary shaft 13 being fixed to the bracket 12. A pulley 14 supported by bearings 15 rotates on the stationary shaft 13 and a dial 16, with appropriate indicia, is positioned upon the pulley 14 and maintained in radial position by a spring 17 and a retaining ring 18. An indicator plate 19, having a scribed line 20 is fixed to the top of the bracket 12 and is used to indicate the degree of rotation of the dial 16.

Figure 3:
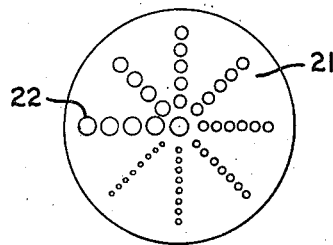
Fig. 3 is an expanded view of the spring retaining cap of the device showing a plurality of holes therein.

Referring to Fig. 3 of the drawing, a cap 21 is shown in which a plurality of various diameter holes 22 are located, said cap 21 being fixed in position on the pulley 14 by means of dowel pins 23, as shown in Fig. 2 of the drawing.

As shown in Figs. 2 and 2 of the drawing, a known weight 24 is attached to a cord 25 by means of a hook 26, said cord 25 being wound on and attached to the pulley 14 and guided in a groove 27 thereof.

A second bracket 28 is slidably mounted on the base 10 between slides 29, the second bracket 28 being equipped with a locking screw 30 for holding the second bracket 28 in a desired position.

A block 31, which contains a plurality of various diameter holes 32, similar to the holes 22 of cap 21, is maintained in position in the second bracket 28 by means of a locking screw 33. The block 31 is bored through to receive a slidable arbor shaft 34, which is secured by a collet arrangement 35 and a locking nut 36. The slidable arbor shaft 34, which is provided with a head 37, serves as a mandrel to receive a quantity of rotatable discs 38, which serve as an anti-friction means for supporting a spring 39 which is being tested. The rotatable discs 38 are selected so that the outside diameter of the rotatable discs 38 will be slightly smaller than the inside diameter of the spring 39 that is to be tested, a sufficient quantity of rotatable discs 38 being used so as to provide for proper support of the spring 39.

In operation the locking screw 30 is loosened and the second bracket 28 is moved longitudinally away from the bracket 12. The rotatable discs 38 are selected to fit the inside diameter of the spring that is to be tested and these rotatable discs are placed on the slidable arbor shaft 34, said shaft then being inserted through the block 31 and locked in a fixed position by the locking nut 36. The block 31 is then secured in the second bracket 28 by tightening the locking screw 33. A spring 39 is then selected, the inside diameter of the spring 39 being fitted over the outside diameter of the rotatable discs 38 and the straight end of the spring 39 is inserted in an appropriate hole 32 of the block 31.

Having secured one end of the spring 39, the second bracket 28 is moved longitudinally toward the bracket 12 until the opposite straight end of the spring 39 engages in an appropriate hole 22 in the cap 21. The locking screw 30 is then tightened so as to secure the spring 39 between the bracket 12 and the second bracket 28.

In order to engage an appropriate hole 22 in the cap 21, the pulley 14 will most probably have to be rotated, therefore it will be necessary to zero the dial 16 relative to the scribed line 20. Since the dial 16 is held in position by friction means of a spring 17 and a retaining ring 18, it will only be necessary to hold the pulley 14 stationary and rotate the dial 16 relative to the pulley 14 until the dial 16 is properly positioned.

An appropriate known weight 24 is added to the cord 25. This weight 24 will act through a lever arm equal to the radius of the pulley 14 and will apply a torque to the spring 39. The applied torque will be the product of the weight 24 times the radius of the pulley 14. The applied torque will tend to rotate the pulley through an angular displacement that will be shown by the dial 16 moving relative to the scribed line 20. Having thus applied a known torque and obtained an angular displacement reading, it can readily be determined by mathematics if the spring 39 meets its design specifications.

While the preferred embodiment of the invention has been shown and described, obviously many modifications and variations of the present invention are possible in the light of the above teaching. It is therefore to be understood that within the scope of the appended claims the invention may be practiced otherwise than as specifically described.

What is claimed is:

1. In combination, a device for testing the torsion of springs comprising, a main supporting base, a fixed bracket on said base, having a stationary extending shaft, a pulley rotatably mounted on said shaft, a slidable bracket adjustable in spatial relation with respect to said fixed bracket, arbor shaft means carried by said slidable bracket with the axis thereof coincident with the axis of said stationary extending shaft, means on each said pulley and said slidable bracket for supporting opposite ends of a torsion spring in loose slidable relation over said arbor shaft means, means for applying a known torque to said pulley, and means indicating the angular relation of said pulley with respect to said fixed bracket.

2. A testing device as set forth in claim 1 wherein said arbor shaft means includes a slidable arbor shaft longitudinally adjustable for supporting various lengths of springs.

3. A testing device as set forth in claim 2 wherein said means on each said pulley and said slidable bracket for supporting opposite ends of a torsion spring comprises a cap removably fixed to said pulley and a block removably fixed to said adjustable racket, said cap and said block each having a plurality of various diameter holes therein.

4. A testing device as set forth in claim 3 wherein said means for applying a known torque to said pulley is a weight attached to a cord, said cord being wound on and fixedly attached to said pulley and wherein said means indicating the angular relation of said pulley with respect to said fixed bracket comprises a dial with indicia thereon, said dial being impositively supported on said pulley by friction means including a pressure spring.

References Cited in the file of this patent

FOREIGN PATENTS

| | | |
|---|---|---|
| 314,925 | Germany | Oct. 18, 1919 |
| 283,787 | Great Britain | Jan. 19, 1928 |
| 733,452 | France | June 9, 1931 |

OTHER REFERENCES

Advertising Bulletin, John Chatillon and Sons, 85 Cliff Street, New York 38, New York, describing Standard and Medium Capacity Torsion Spring Tester.